US010458225B2

(12) United States Patent
Perez

(10) Patent No.: US 10,458,225 B2
(45) Date of Patent: Oct. 29, 2019

(54) MITIGATING FLUID POUND EFFECTS UNDER INCOMPLETE PUMP FILLAGE CONDITIONS

(71) Applicant: General Electric Company, Schenectady, NY (US)

(72) Inventor: Gerardo Perez, Missouri City, TX (US)

(73) Assignee: General Electric Company, Schenectady, NY (US)

(*) Notice: Subject to any disclaimer, the term of this patent is extended or adjusted under 35 U.S.C. 154(b) by 118 days.

(21) Appl. No.: 15/858,833

(22) Filed: Dec. 29, 2017

(65) Prior Publication Data

US 2019/0203577 A1 Jul. 4, 2019

(51) Int. Cl.
| E21B 47/00 | (2012.01) |
| E21B 43/12 | (2006.01) |
| E21B 47/09 | (2012.01) |
| G01P 3/00 | (2006.01) |
| G01L 5/00 | (2006.01) |
| E21B 34/08 | (2006.01) |
| E21B 34/00 | (2006.01) |

(52) U.S. Cl.
CPC ........ *E21B 47/0007* (2013.01); *E21B 43/126* (2013.01); *E21B 47/09* (2013.01); *G01L 5/0061* (2013.01); *G01P 3/00* (2013.01); *E21B 34/08* (2013.01); *E21B 2034/002* (2013.01)

(58) Field of Classification Search
CPC ..... E21B 43/127; E21B 47/0008; E21B 47/09
See application file for complete search history.

(56) References Cited

U.S. PATENT DOCUMENTS

| 3,509,824 | A | * | 5/1970 | Schmidly, Jr. | H02H 7/0827 318/474 |
| 8,844,626 | B1 | * | 9/2014 | Krug | F04B 47/026 166/250.08 |
| 10,202,973 | B1 | * | 2/2019 | Dreher | F04B 47/145 |
| 2010/0326668 | A1 | * | 12/2010 | Griffiths | E21B 43/127 166/369 |
| 2014/0079560 | A1 | * | 3/2014 | Hodges | F04B 47/04 417/15 |
| 2015/0142319 | A1 | * | 5/2015 | McCoy | E21B 47/0007 702/9 |
| 2016/0102542 | A1 | * | 4/2016 | DaCunha | E21B 47/0008 702/6 |
| 2017/0152737 | A1 | * | 6/2017 | Pons | E21B 43/127 |
| 2017/0306745 | A1 | * | 10/2017 | Harding | E21B 47/0008 |

* cited by examiner

*Primary Examiner* — Shane Bomar
(74) *Attorney, Agent, or Firm* — Mintz Levin Cohn Ferris Glovsky and Popeo, P.C.

(57) ABSTRACT

The current subject matter provides a tool and user interface for estimating a velocity at which a plunger of a rod lift pump system will impact a fluid within a well when the rod lift pump system is altered to operate under various conditions of pump fillage. In some embodiments, the estimated impact velocity can be determined using a velocity pattern characterizing a velocity and position of a plunger of a rod lift pump system operating under a condition of complete pump fillage. The estimated impact velocity can provide a user with useful insight into potential operation of the rod lift pump system when operating under various conditions of pump fillage.

22 Claims, 12 Drawing Sheets

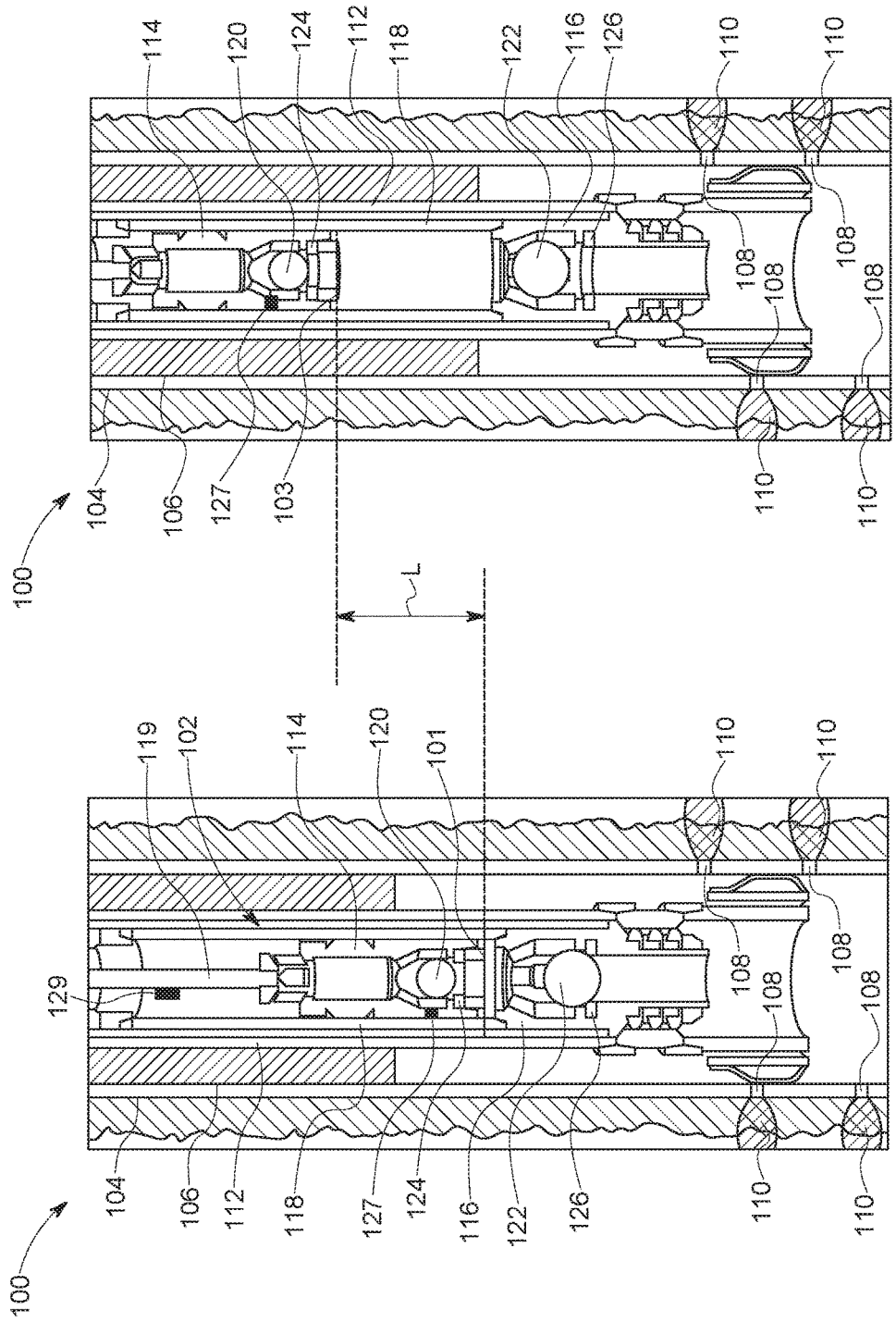

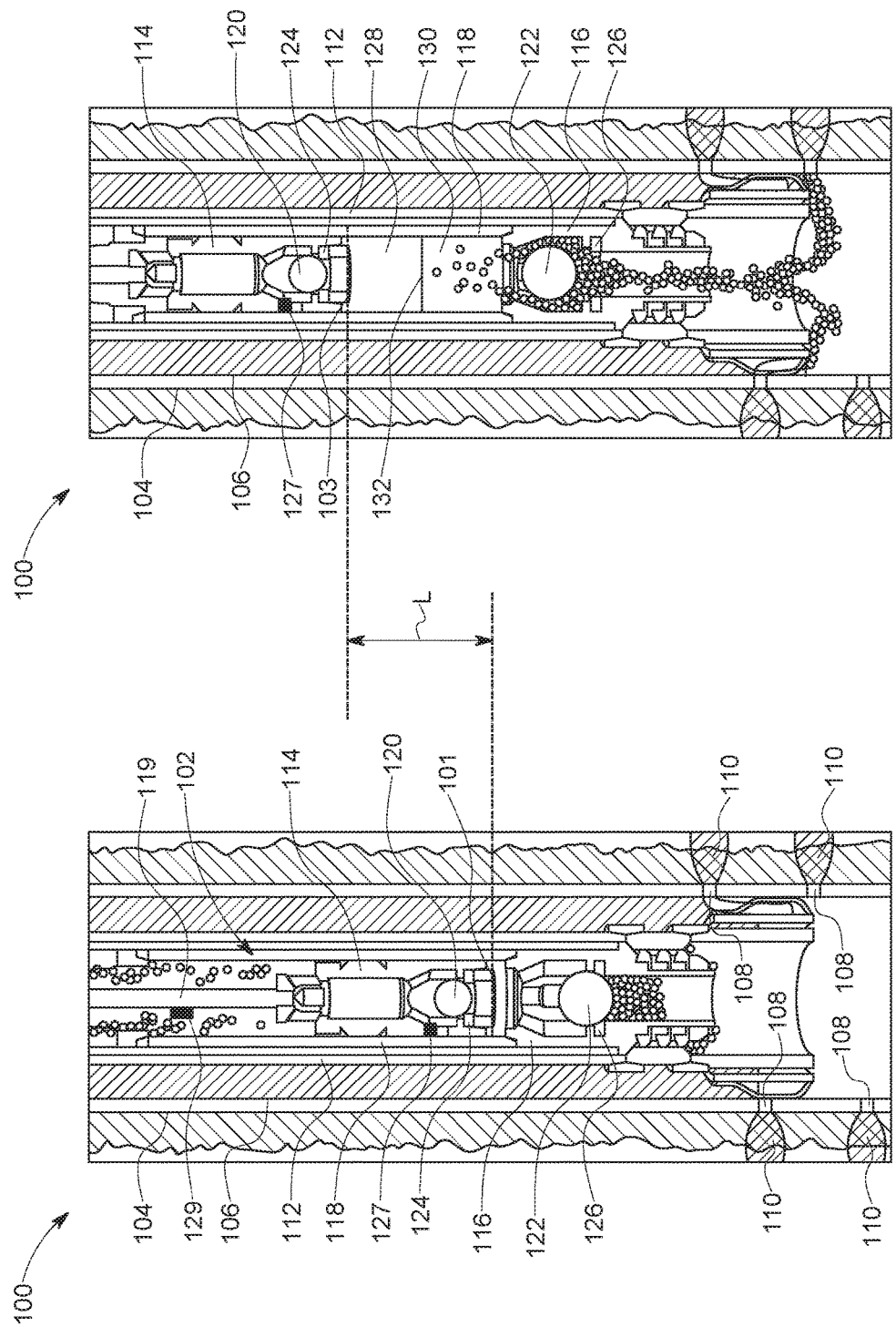

MITIGATING FLUID POUND EFFECTS UNDER INCOMPLETE PUMP FILLAGE CONDITIONS

BACKGROUND

Rod lift pump systems such as, e.g., beam pump systems, or sucker-rod pump systems, can be used to generate artificial lift to extract liquid from wells. Rod lift pump systems can include a surface pumping unit, which drives a plunger up and down within a barrel positioned within a well to generate artificial lift to extract liquid from the well. One parameter that can affect performance of the rod lift pump systems is pump fillage. Pump fillage can describe an amount of fluid that is within the barrel prior to a downstroke of the plunger. Pump fillage can be expressed as the amount of fluid within the well prior to the downstroke of the plunger, relative to a total amount of fluid that can be extracted based on a stroke length of the plunger. A fillage set point can describe a minimum acceptable pump fillage prior to a downstroke of the plunger. In some cases, if the pump fillage is less than the fillage set point prior to a downstroke of the plunger, the rod lift system can stop or slow pumping to allow the barrel to fill (thereby increasing the pump fillage). Typically, rod lift systems are set to operate with a pump fillage set point that is between 70% and 80%. By adjusting the pump fillage set point, the performance of the rod lift system can be altered. For example, decreasing the pump fillage set point can increase a volume of production from the well, but it can also lead to an increased risk of damaging components of the pump as a result of fluid pound. Fluid pound can occur when the rod lift system operates at less than 100% fillage causing the plunger to strike fluid within the barrel during down stroke.

SUMMARY

Systems, devices, articles, and methods for mitigating fluid pound are provided. In an aspect, a method is provided that includes receiving position data characterizing a position of a plunger over time. The plunger can form part of a rod lift pump system and the position can be measured by a first sensor. The plunger can be configured to travel between a first position and a second position within a barrel within a well, where a distance between the first position and the second position can define a stroke length. The method can also include receiving load data characterizing a load on a rod over time. The load can be measured by a second sensor and the rod can be coupled to the plunger. The method can further include receiving velocity data characterizing a velocity of the plunger while the rod lift pump system is operating under a condition of complete pump fillage. When operating under a condition of complete pump fillage, a portion of the barrel between the first position and the second position is completely filled with liquid prior to a downstroke of the plunger. The method can also include correlating, using at least the received load data and position data, the load on the rod and the position of the plunger. The method can include and displaying, on a graphical interface display space, a visualization of the velocity data simultaneously with a visualization of the correlated load and position.

One or more of the following features can be included in any feasible combination. In some embodiments, correlating the load on the rod and the position of the plunger can include determining a position of the plunger at a first time, determining a load on the rod at the first time, and matching the position of the plunger at the first time and load of the rod at the first time.

In some embodiments, the method can include determining the velocity data using at least the received position data.

In some embodiments, the load data can characterize the load on the rod coupled to the plunger over time while the rod lift pump system is operating under a condition of incomplete pump fillage. When operating under a condition of incomplete pump fillage, a portion of the barrel between a first position and the second position can be filled with gas prior to a downstroke of the plunger.

In some embodiments, the rod can be configured to drive the plunger between the first position and the second position.

In some embodiments, the method can include correlating, using at least the position data and the velocity data, the position and the velocity of the plunger. The method can also include displaying, on the graphical interface display space, an interactive graphical element that can be configured to interact with the visualization of the correlated load and position. A position of the interactive graphical element can be adjustable by a user. The position of the interactive graphical element can identify a position of the plunger and a correlated load on the rod. The method can include displaying, on a graphical interface display space, a visualization of a velocity of the plunger corresponding to the identified position of the plunger based on the correlated velocity and position of the plunger.

In some embodiments, the visualization of the velocity of the plunger corresponding to the identified position of the plunger can include a textbox graphical element.

In some embodiments, at least one of the receiving, the correlating, and the displaying can be performed by at least one data processor forming part of at least one computing system.

In another aspect, a non-transitory computer program product is provided having computer readable instructions, which, when executed by at least one data processor forming part of at least one computing system, implement operations which can include receiving position data characterizing a position of a plunger over time. The plunger can form part of a rod lift pump system and the position can be measured by a first sensor. The plunger can be configured to travel between a first position and a second position within a barrel within a well, where a distance between the first position and the second position can define a stroke length. The operations can also include receiving load data characterizing a load on a rod over time. The load can be measured by a second sensor and the rod can be coupled to the plunger. The operations can further include receiving velocity data characterizing a velocity of the plunger while the rod lift pump system is operating under a condition of complete pump fillage. When operating under a condition of complete pump fillage, a portion of the barrel between the first position and the second position is completely filled with liquid prior to a downstroke of the plunger. The operations can also include correlating, using at least the received load data and position data, the load on the rod and the position of the plunger. The operations can include and displaying, on a graphical interface display space, a visualization of the velocity data simultaneously with a visualization of the correlated load and position.

One or more of the following features can be included in any feasible combination. In some embodiments, correlating the load on the rod and the position of the plunger can include determining a position of the plunger at a first time, determining a load on the rod at the first time, and matching the position of the plunger at the first time and load of the rod at the first time.

In some embodiments, the operations can include determining the velocity data using at least the received position data.

In some embodiments, the load data can characterize the load on the rod coupled to the plunger over time while the rod lift pump system is operating under a condition of incomplete pump fillage. When operating under a condition of incomplete pump fillage, a portion of the barrel between a first position and the second position can be filled with gas prior to a downstroke of the plunger.

In some embodiments, the rod can be configured to drive the plunger between the first position and the second position.

In some embodiments, the operations can include correlating, using at least the position data and the velocity data, the position and the velocity of the plunger. The operations can also include displaying, on the graphical interface display space, an interactive graphical element that can be configured to interact with the visualization of the correlated load and position. A position of the interactive graphical element can be adjustable by a user. The position of the interactive graphical element can identify a position of the plunger and a correlated load on the rod. The operations can include displaying, on a graphical interface display space, a visualization of a velocity of the plunger corresponding to the identified position of the plunger based on the correlated velocity and position of the plunger.

In some embodiments, the visualization of the velocity of the plunger corresponding to the identified position of the plunger can include a textbox graphical element.

In another aspect, a system is provided having at least one data processor and memory coupled to the processor, the memory storing executable instructions, which, when executed by the at least one data processor, implement operations which can include receiving position data characterizing a position of a plunger over time. The plunger can form part of a rod lift pump system and the position can be measured by a first sensor. The plunger can be configured to travel between a first position and a second position within a barrel within a well, where a distance between the first position and the second position can define a stroke length. The operations can also include receiving load data characterizing a load on a rod over time. The load can be measured by a second sensor and the rod can be coupled to the plunger. The operations can further include receiving velocity data characterizing a velocity of the plunger while the rod lift pump system is operating under a condition of complete pump fillage. When operating under a condition of complete pump fillage, a portion of the barrel between the first position and the second position is completely filled with liquid prior to a downstroke of the plunger. The operations can also include correlating, using at least the received load data and position data, the load on the rod and the position of the plunger. The operations can include and displaying, on a graphical interface display space, a visualization of the velocity data simultaneously with a visualization of the correlated load and position.

One or more of the following features can be included in any feasible combination. In some embodiments, correlating the load on the rod and the position of the plunger can include determining a position of the plunger at a first time, determining a load on the rod at the first time, and matching the position of the plunger at the first time and load of the rod at the first time.

In some embodiments, the operations can include determining the velocity data using at least the received position data.

In some embodiments, the load data can characterize the load on the rod coupled to the plunger over time while the rod lift pump system is operating under a condition of incomplete pump fillage. When operating under a condition of incomplete pump fillage, a portion of the barrel between a first position and the second position can be filled with gas prior to a downstroke of the plunger.

In some embodiments, the rod can be configured to drive the plunger between the first position and the second position.

In some embodiments, the operations can include correlating, using at least the position data and the velocity data, the position and the velocity of the plunger. The operations can also include displaying, on the graphical interface display space, an interactive graphical element that can be configured to interact with the visualization of the correlated load and position. A position of the interactive graphical element can be adjustable by a user. The position of the interactive graphical element can identify a position of the plunger and a correlated load on the rod. The operations can include displaying, on a graphical interface display space, a visualization of a velocity of the plunger corresponding to the identified position of the plunger based on the correlated velocity and position of the plunger.

In some embodiments, the visualization of the velocity of the plunger corresponding to the identified position of the plunger can include a textbox graphical element.

DESCRIPTION OF DRAWINGS

FIG. 1 is a downhole portion of a well configuration that includes a downhole pump operating under a condition of complete pump fillage, wherein a plunger of the downhole pump is in a first position;

FIG. 2 is the downhole portion of the well configuration shown in FIG. 1, wherein the plunger is in a second position;

FIG. 3 is a downhole portion of the well configuration shown in FIG. 1, with the plunger in the first position, wherein the downhole pump is operating under a condition of incomplete pump fillage;

FIG. 4 is the downhole portion of the well configuration shown in FIG. 3, wherein the plunger is in the second position;

DETAILED DESCRIPTION

Figure 5:
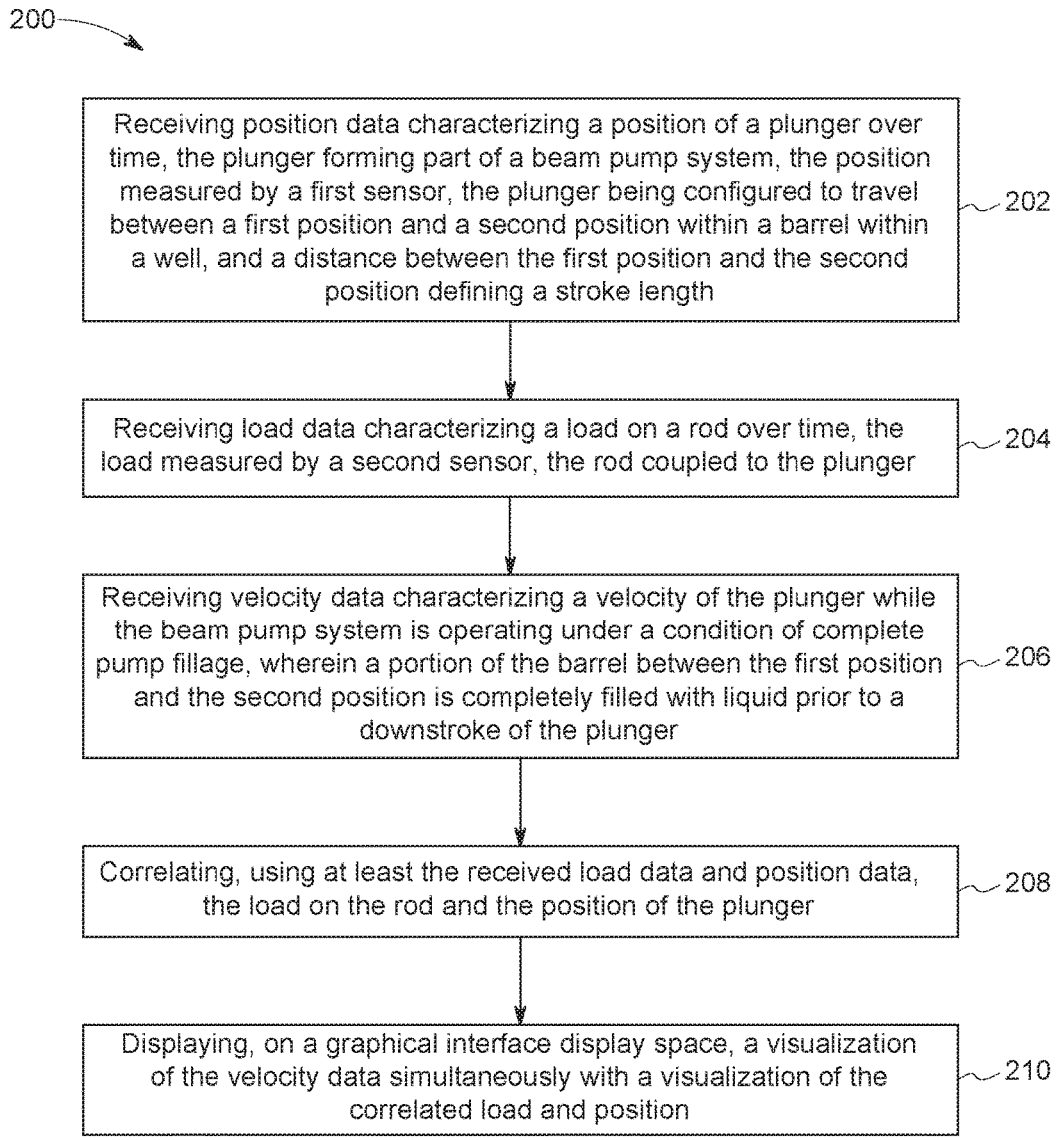
FIG. 5 is a process flow diagram of an exemplary method for providing a user with estimated velocities at which a plunger will impact liquid in a well under various conditions of pump fillage.

Certain exemplary embodiments will now be described to provide an overall understanding of the principles of the structure, function, manufacture, and use of the systems, devices, and methods disclosed herein. One or more examples of these embodiments are illustrated in the accompanying drawings.

Rod lift pump systems, or sucker-rod pump systems, can be used to generate artificial lift to extract liquid from wells. As described above, one parameter that can affect performance of the rod lift pump systems is pump fillage. In some cases, incomplete pump fillage can lead to fluid pound, which can damage the rod lift pump system due to high forces exerted on components that drive the plunger. In some cases, a pump fillage set point can be implemented as an operational parameter. The pump fillage set point can describe a minimum acceptable pump fillage prior to a downstroke of the plunger. In some cases, if the pump fillage is less than the pump fillage set point prior to a downstroke of the plunger, the rod lift pump system can stop, or slow, pumping to allow the pump fillage to increase. By adjusting the pump fillage set point, the performance of the rod lift pump system can be altered. For example, decreasing the pump fillage set point can increase runtime, well inflow, and ultimately a volume of production from the well, but it can also lead to an increased risk of damaging components of the pump as a result of fluid pound.

But there may be limited information available for a production engineer or rod lift system operators to determine whether it is safe to decrease, or increase, a pump fillage set point of a rod lift system. The current subject matter provides a tool and user interface for estimating a velocity at which a plunger of a rod lift system will impact a fluid, gas, or a combination of both fluid and gas, within a well. The estimated impact velocity can provide a user with useful insight into potential operating conditions of the rod lift system while operating under various conditions of pump fillage. For example, if the estimated impact velocity is high under a certain condition of pump fillage, a user can choose to set the pump fillage set point at a different value, where an estimated impact velocity is lower. Therefore, the user can limit the estimated plunger impact velocity. The tool and user interface can provide a quick estimate of impact velocity of the plunger without requiring time consuming modeling efforts.

As described herein, rod lift systems can include a surface pumping unit, which can be attached to a rod string that drives a plunger up and down within a barrel positioned within a well to generate artificial lift to extract liquid from the well. FIGS. 1-2 are cross section views showing a downhole portion of a well 100 that includes a downhole pump 102 configured to facilitate extracting liquid from the well 100. FIG. 1 shows a plunger 114 of the downhole pump 102 in a first position 101, and FIG. 2 shows the plunger 114 in a second position 103.

In the illustrated embodiment, the well 100 has a primary well bore 104, and includes a casing 106 that extends along the length of the well bore 104. The casing 106 can include perforations 108 that can align with fractures 110 in the well bore 104 such that fluid can flow from the fractures 110, through the perforations 108, and into the casing 106 of the well 100.

The well 100 can include tubing 112 that can extend into the well bore 104 from a surface opening of the well 100. The tubing 112 can be configured to receive liquid from the well 100 and to facilitate extraction of liquid from the well 100. The downhole pump 102 can be retained within and/or coupled to the tubing 112, and can include the plunger 114, a stationary valve assembly 116, and a barrel 118. The barrel 118 can retain the plunger 114, and can be positioned within the tubing 112. The stationary valve assembly 116 can be coupled to the barrel 118, and can be positioned downhole relative to the plunger 114. The plunger 114 and the stationary valve assembly 116 can include a traveling valve 120 and a standing valve 122, respectively. The traveling valve 120 and the standing valve 122 can be configured to permit fluid to flow upward relative to the plunger 114 and the stationary valve assembly 116, respectively.

As shown in FIGS. 1-2, a rod 119 can be coupled to the plunger 114. The rod 119 can also be coupled to a surface pumping unit (not shown) such that the surface pumping unit can drive the plunger 114 back and forth between the first position 101 and the second position 103 to extract liquid from the well 100. The motion of the plunger between the first position 101 and the second position 103 can define a pump cycle. A distance between the first position 101 and the second position 103 can define a stroke length L of the plunger 114. A stroke rate, typically defined in strokes per minute, can characterize a number of complete strokes, including an upstroke and a downstroke, which the plunger 114 can undergo in a given amount of time.

In operation, as the plunger 114 driven from the first position 101 to the second position 103, e.g., during an upstroke, the traveling valve 120 is forced against a seat 124 of the plunger 114, the standing valve 122 is drawn away from a seat 126 of the stationary valve assembly 116, and liquid is drawn into the barrel 118. During the upstroke, liquid that is positioned above the traveling valve 120 is forced toward the surface opening of the well 100, thereby allowing it to be extracted.

As the plunger 114 is driven from the second position 103 to the first position 101, e.g., during a downstroke, the standing valve 122 is forced against the seat 126 of the stationary valve assembly 116, the traveling valve 120 is forced away from the seat 124 of the plunger 114, and liquid between the plunger 114 and the stationary valve assembly 116 flows into, and/or through, the plunger 114.

While the downhole pump 102 is operating under a condition of complete pump fillage, as shown in FIGS. 1-2, liquid from the well 100 is drawn into the barrel 118 at the same rate as the plunger 114 is driven toward the second position 103 during the upstroke, and a portion of the barrel 118 between the first position 101 and the second position 103 is completely filled with liquid prior to the downstroke, as shown in FIG. 2. During operation, a position sensor 127 and a load sensor 129 can measure a position of the plunger 114 over time, and a load on the rod 119, over time, respectively. In some embodiments, the position sensor 127 can be an accelerometer, and the load sensor 129 can be a load cell. In some embodiments, position and load sensors can be located at a surface location of the well 100, and can measure a position of the rod 119, and a load on the rod 119, at the surface. The position sensors can be a combination or rotations-per-minute (RPM) and crank transducers, inclinometers, and/or accelerometers. The load sensors can be, e.g., one or more load cells.

In some cases, well production can be increased by operating the downhole pump under conditions of incomplete pump fillage. As an example, incomplete pump fillage can occur in systems in which gas is not separated, or in systems in which pump displacement exceeds well inflow. For example, if a rate of extraction of liquid from a well exceeds a rate at which the well can refill, gas can be drawn into the well during the upstroke, thereby creating a condition of incomplete pump fillage. In some cases, a void section can be created in an upper part of the pump during the upstroke, thereby creating a condition of incomplete pump fillage. FIGS. 3-4 show the well 100 when the downhole pump 102 is operating under a condition of incomplete fillage.

While operating under a condition of incomplete fillage, liquid and gas can be drawn into the barrel 118 during an upstroke of the plunger 114, and a portion of the barrel 118 between the first position 101 and the second position 103 can contain a combination of gas 128 and liquid 130, as shown in FIG. 4. Pump fillage can be described as a height of the liquid 130 between the first position 101 and a liquid-gas interface 132 relative to the stroke length L. Pump Fillage can be expressed as a percentage.

The presence of the gas 128, or a void or empty portion of an upper section of the barrel 118 can result in "fluid pound" during a downstroke of the plunger 114. For example, as the plunger 114 is driven from the second position 103 to the first position 101 during the downstroke, the plunger can compress the vapor 128 and can strike the liquid-gas interface 132. An abrupt change in density and viscosity between the gas 128 and the liquid 130 during the downstroke can jar components of the rod lift system. For example, fluid pound can buckle the rod 119 as a result of an abrupt change in load on the rod 119.

In some cases, a pump fillage set point can be used to control operating conditions of a rod lift system. As described herein, a pump fillage set point can describe a minimum acceptable pump fillage prior to a downstroke of a plunger. In certain cases, decreasing the pump fillage set point can result in increased production from wells. However, decreasing the pump fillage set point can also result in more fluid pound, which, as described herein, can be detrimental to the rod lift system.

There may be limited information available for a rod lift system operator, such as a production engineer, to determine whether it is safe to decrease or increase, a pump fillage set point of a rod lift system. FIG. 5 illustrates a process flow diagram of an exemplary method 200 for estimating a velocity at which a plunger of a rod lift system (e.g., a sucker rod system or a beam pump system) will impact a fluid within a well when the rod lift system is altered to operate under various pump fillage conditions. The estimated impact velocity can provide a user with useful insight into potential operation of the rod lift system while operating under various conditions of pump fillage. For example, if the estimated impact velocity is high under a certain condition of pump fillage, which might cause a rod of the rod lift system to buckle, a user can choose to set the pump fillage set point at a different value in which an estimated impact velocity is lower.

Figure 6:
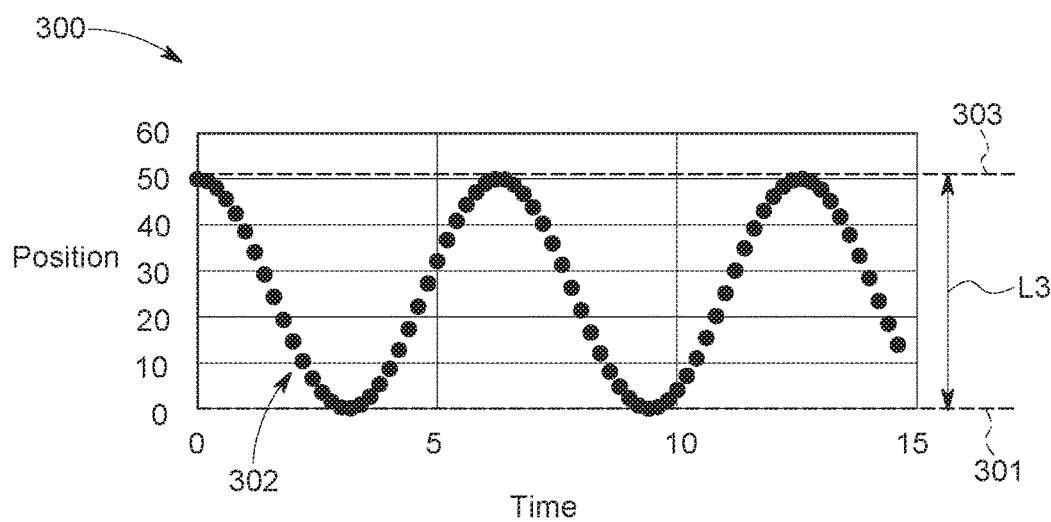
FIG. 6 is a plot of exemplary position data that characterizes a position of a plunger of a rod lift pump system over time.

As shown at step 202 in FIG. 5, the method 200 can include receiving position data characterizing a position of a plunger (e.g., the plunger 114 shown in FIGS. 1-4) over time. The plunger can form part of a rod lift system, and the position can be measured by a first sensor (e.g., the position sensor 127 shown in FIGS. 1-4). The plunger can be configured to travel between a first position and a second position within a barrel within a well, and a distance between the first position and the second position can define a stroke length. In some embodiments, the position sensor can provide the position data to a data processor that can process the position data. FIG. 6 shows a plot 300 that includes exemplary position data 302 that characterizes a position of a plunger over time. As shown in the illustrated example, the plunger can travel between a first position 301 and a second position 303 in which a distance between the first position and the second position defines a stroke length L3.

Figure 7:
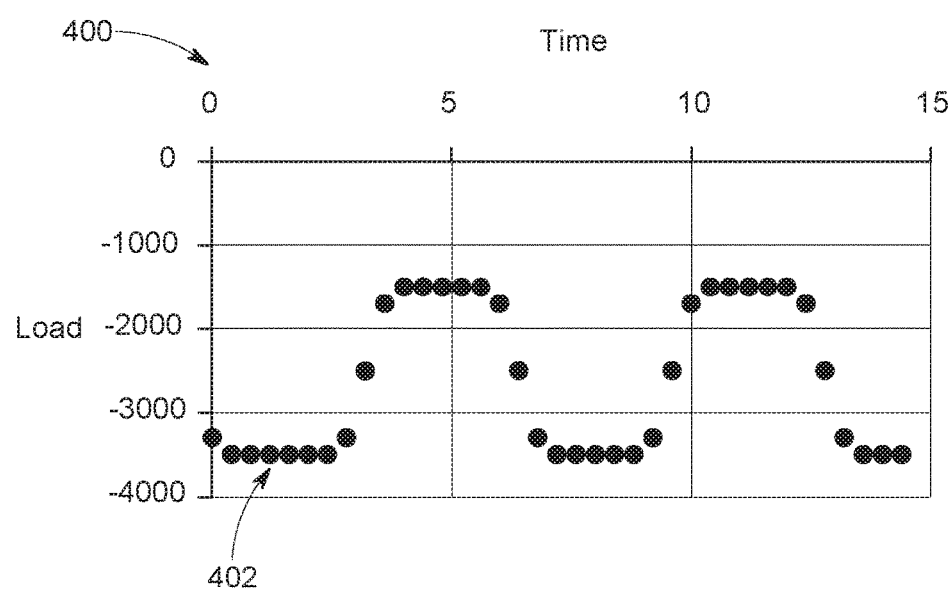
FIG. 7 is a plot of exemplary load data that characterizes a load on a rod of a rod lift pump system over time.

The method 200 can also include receiving load data characterizing a load on a rod (e.g., the rod 119 shown in FIGS. 1-4) over time, the being load measured by a second sensor (e.g., the load sensor 129), the rod coupled to the plunger, as shown at step 204. In some embodiments, the load sensor can provide the load data to a data processor that can process the data. As an example, the data processor can be the same data processor that receives the position data. FIG. 7 shows a plot 400 that includes exemplary load data 402 that characterizes a load on a rod over time. In some cases, a "surface dynagraph" can be generated based on sensor measurements from sensors positioned at a surface of the well. A "downhole dynagraph" can be determined using the surface dynagraph. The downhole dynagraph can include the load data and position data.

As shown as step 206, the method 200 can include receiving velocity data characterizing a velocity of the plunger while the rod lift system is operating under a condition of complete pump fillage, wherein a portion of the barrel between the first position and the second position is completely filled with liquid prior to a downstroke of the plunger, as described above with regard to FIGS. 1-2. In some embodiments, the velocity of the plunger can be determined using position data. For example, the data processor can process the position data, and determine a change in position over a corresponding change in time to determine a velocity of the plunger at a given time.

Figure 8:
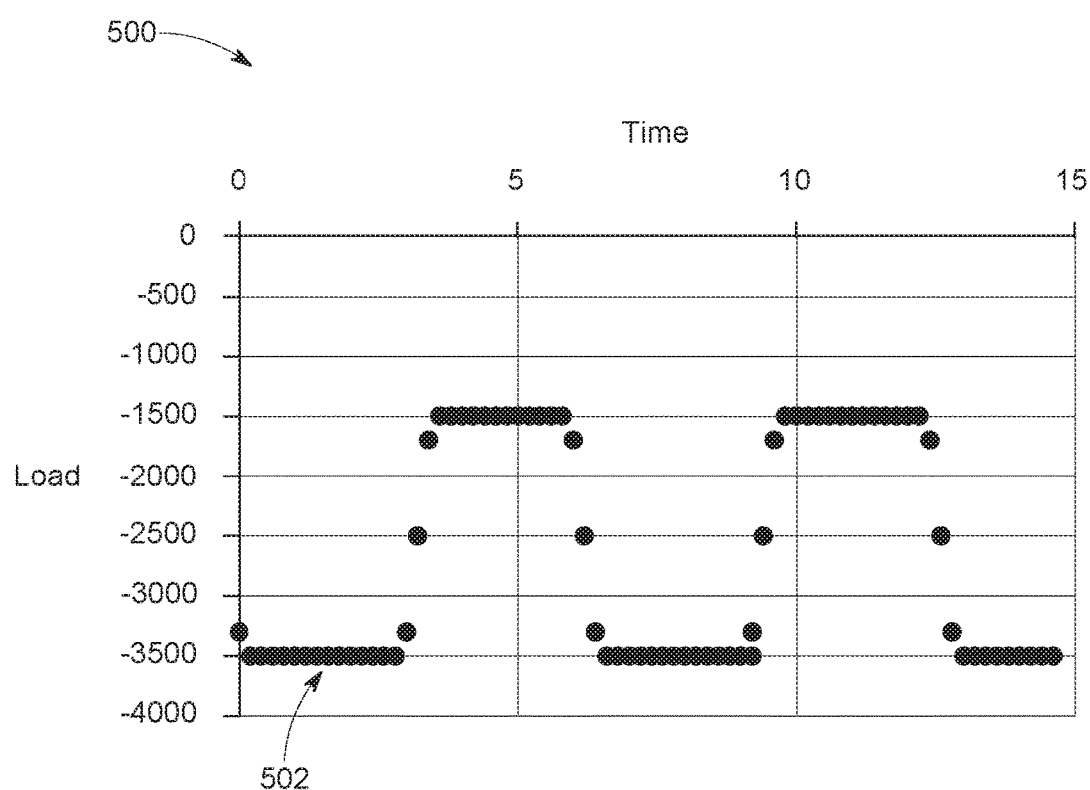
FIG. 8 is a plot of load data that has been interpolated such that it has the same temporal resolution as the position data shown in FIG. 5.

At step 208, the method 200 can include correlating, using at least the received load data and position data, the load on the rod and the position of the plunger. As shown in FIGS. 6-7 the position data 302 and the load data 402 can characterize a position of the plunger and a load on the rod over a period of time. Accordingly, the position of the plunger at a given time can be correlated to the load on the rod at the given time. In some cases, the position data 302 and the load data 402 can have different temporal resolutions, and can have data points that do not align in time, as shown in FIGS. 6-7. In such cases, the load data 402 can be interpolated such that the load data 402 has the same temporal resolution as the position data 302, and the position of the plunger and the load on the rod can be correlated. FIG. 8 shows a plot 500 that includes load data 502, based on the load data 402 shown in FIG. 7, that has been interpolated such that the load data 502 has the same temporal resolution as the position data 302, and such that data points of load data 502 and data points of the position data 302 align in time. Therefore, a load on the rod at a given time can be matched to a position of the plunger at the given time. Accordingly, load on the rod can be determined based on a position of the plunger, and vice versa. There are a number of other ways that can facilitate correlating the load on the rod and the position of the plunger. For example, portions of the load data 402 and position data 302 can be curve fit, providing a set of equations that can be solved for load as a function of position, or vice versa. Other implementations are possible.

During normal operation, the load on the rod and the velocity of the plunger at a given position in the pump cycle can vary between pump cycles. Accordingly, load data used can be averaged over two or more pump cycles. For example, load on the rod at a given position in the pump cycle can be averaged over multiple pump cycles to generate an averaged value of load on the rod at the given position. Similarly, velocity data can be averaged over two or more pump cycles. For example, velocity of the plunger at a given position in the pump cycle can be averaged over multiple pump cycles to generate an averaged velocity of the plunger at the given position.

In some embodiments, the velocity of the plunger can be correlated to the position of the plunger in a manner similar to that described herein with regard to the correlated load on the rod and position of the plunger. Accordingly, the velocity data can characterize the velocity and correlated position of the plunger.

As shown at step 210, the method can further include displaying, on a graphical interface display space, a visualization of the velocity data simultaneously with a visualization of the correlated load and position. For example, the data processor can provide the velocity data and correlated load and position data to a user device such that the user device can display the data on graphical interface display space. The velocity data can provide an estimate of a velocity at which the plunger will impact liquid under various conditions of pump fillage, as described in more detail below.

Figure 9:
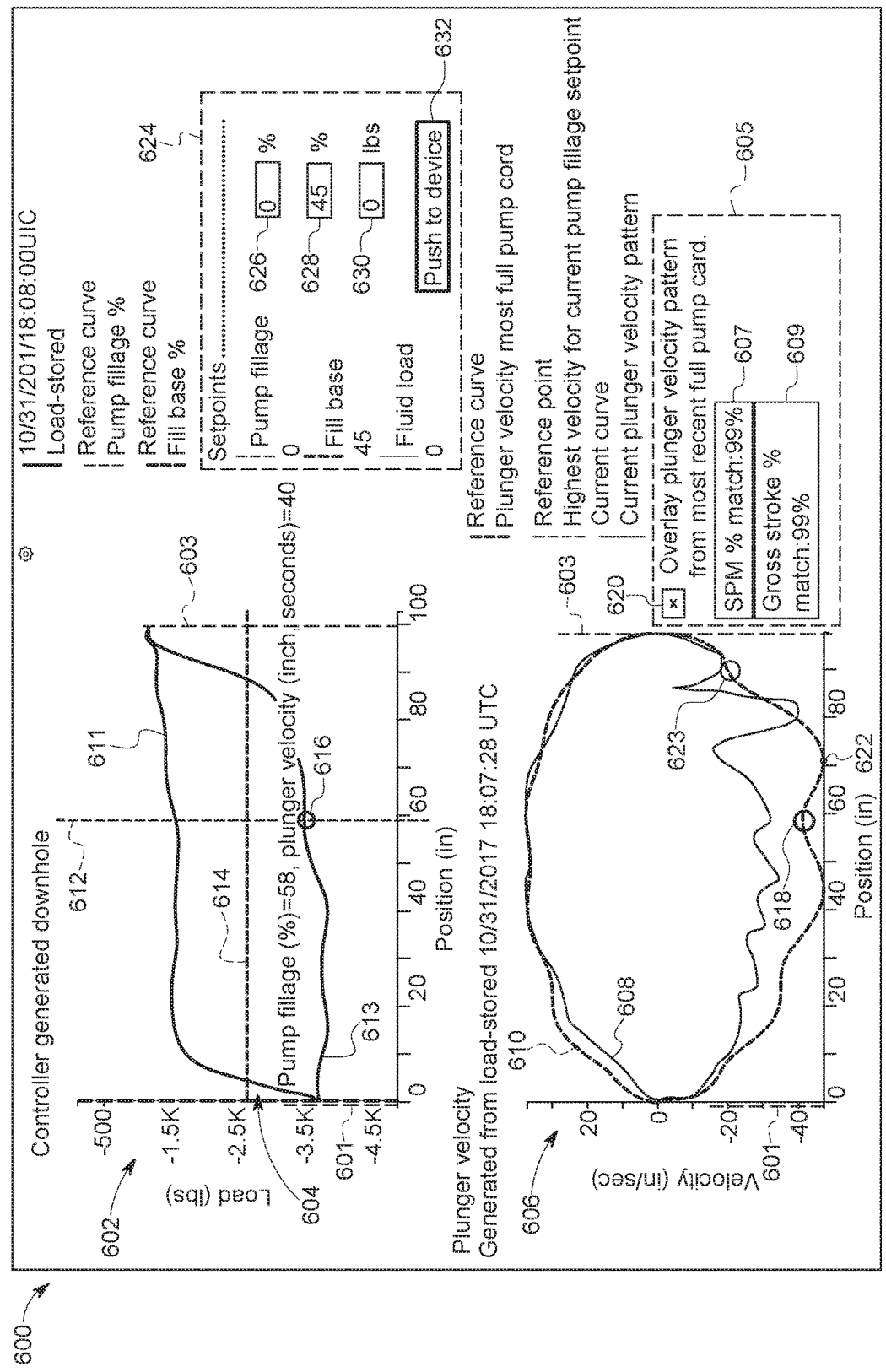
FIG. 9 is a view of an exemplary graphical user interface (GUI) of an advisory system that shows a load pattern and a velocity pattern.

FIG. 9 shows a view 600 of an exemplary graphical user interface (GUI) that can be rendered on a display of a user device. The GUI includes a load plot 602 that shows a load pattern 604, and a velocity plot 606 that shows first and second velocity patterns 608, 610.

The load pattern 604 characterizes correlated load on a rod and position of a plunger of a rod lift system operating under a first set of operating parameters. For example, the first set of operating parameters can include a current set of operating parameters, and can include a first stroke rate, a first stroke length, and a first pump fillage. In some embodiments, the load pattern can characterize correlated load on the rod and position of the plunger of the rod lift system while operating under a condition of complete pump fillage. In other embodiments, the load pattern can characterize correlated load on the rod and position of the plunger of the rod lift system while operating under a condition of incomplete pump fillage. During operation, the plunger can travel between a first position 601 and a second position 603. The plunger can travel from the first position 601 to the second position 603 during an upstroke, and from the second position 603 to the first position 301 during a downstroke. An upper portion 611 of the load pattern 604 corresponds to an upstroke of the plunger, and a lower portion 613 of the plunger corresponds to a downstroke of the plunger.

As shown in FIG. 9, the load plot 602 can include a slider 612 that can be moved along an X axis of the plot 602 to identify a hypothetical pump fillage set point. The slider 612 can also identify current values of load on the rod corresponding to a position of the slider 612. The current values of load on the rod can be load values corresponding to positions in which the slider 612 intersects the upper and lower portions 611, 613 of the load pattern 604. The load plot 602 can also include a graphical element 614 that identifies a fill base and characterizes a buoyancy force on the rod of the lift rod system. In the illustrated example, the stroke length of the plunger is 100 inches (in.), and the slider is positioned at 58 in. Accordingly, the slider 612 identifies a hypothetical, or current, pump fillage set point of 58%.

The load plot 602 can also include a first graphical indicator 616 that can be moved along the downstroke portion 613 of the load pattern 604 to identify the hypothetical pump fillage set point. The first graphical indicator 616 can also identify a magnitude of load on the rod during a downstroke of the plunger. The first graphical indicator 616 can have a default location corresponding to a position where the slider 612 intersects the downstroke portion 613 of the load pattern 604. In the illustrated example, the first graphical indicator 616 identifies a hypothetical, or current, pump fillage set point of 58%. In some embodiments, the first graphical indicator 616 can move in conjunction with movement of the slider 612. For example, if the slider is moved to 50 in. on the X axis, the first graphical indicator can move along the downstroke portion 613 of the load pattern 604 with the slider 612 to the position of 50 in. In other embodiments, the slider 612 and the first graphical indicator 616 can be moved independently.

The first velocity pattern 608 characterizes correlated velocity and position of the plunger of the rod lift system while operating under the first set of operating parameters. Accordingly, the load pattern and the first velocity pattern characterize operation of the rod lift system under the first set of operating parameters.

The second velocity pattern 610 characterizes correlated velocity and position of the plunger of the rod lift system when operating under a second set of operating parameters which can be different than the first set of operating parameters. The second set of operating parameters can include a second stroke rate, a second stroke length, and second pump fillage that can be different from the first stroke rate, the first stroke length, and the first pump fillage. However, in certain cases, the second stroke rate and the second stroke length can be approximately equal to the first stroke rate and the first stroke length, respectively. As used herein, approximately equal includes values of the second stroke rate and the second stroke length that are within about 10% of the values of the first stroke rate and the first stroke length, respectively. In the illustrated example, the second velocity pattern 610 characterizes correlated velocity and position of the plunger while operating under a condition of complete pump fillage. The second stroke rate and stroke length are approximately equal to the first stroke rate and stroke length. In the illustrated example, positive values of velocity correspond to the upstroke of the plunger, and negative values of velocity correspond to the downstroke of the plunger.

During normal operation, the load on the rod and the velocity of the plunger at a given position in the pump cycle can vary between pump cycles. Accordingly, load data used to generate the load pattern 604 can be averaged over two or more pump cycles. For example, load on the rod at a given position in the pump cycle can be averaged over multiple pump cycles to generate an averaged value of load on the rod at the given position. Similarly, velocity data used to generate the velocity patterns 608, 610 can be averaged over two or more pump cycles for each of the velocity patterns 608, 610. For example, velocity of the plunger at a given position in the pump cycle can be averaged over multiple pump cycles to generate an averaged velocity of the plunger at the given position.

Alternatively, the load pattern 604 can correspond to load data from a single pump cycle (e.g., the previous complete pump cycle). Similarly, the first velocity pattern 608 can correspond velocity data from a single pump cycle (e.g., the previous complete pump cycle). The second velocity pattern 610 can correspond velocity data that has been averaged over two or more pump cycles.

The velocity plot 606 can include a second graphical indicator 618 that can identify an estimated velocity at which a plunger will impact liquid within a well given a pump fillage that is equal to the hypothetical pump fillage set point identified by the first graphical indicator 616. The second graphical indicator 618 can be located on the downstroke portion of the second velocity pattern 610, at a position that corresponds to the position of the first graphical indicator 616 on the load pattern 604. For example, as shown in FIG. 9, the second graphical indicator 618 is located on the downstroke portion of the velocity pattern at a position of 58 in., which corresponds to the hypothetical pump fillage of 58%, as identified by first graphical indicator 616. Accordingly, the second graphical indicator 618 identifies an estimated impact velocity of approximately 40 in./second (sec.) based on the condition of 58% pump fillage. In the illustrated embodiment, the position of the second graphical indicator 618 can change as a result of a change of the position of the first graphical indicator 616 changes. In some embodiments, the position of the first graphical indicator 616 can change as a result of a change of the position of the second graphical indicator 618. Therefore, the position of the slider 612 can change as a result of a change of the position of the second graphical indicator 618, and vice versa.

Under ideal conditions, a plunger can be expected to reach a maximum velocity magnitude at a point midway through the downstroke of the pump cycle, with the velocity smoothly increasing until the midway point, and decreasing thereafter, until the downstroke is complete. Accordingly, for a stroke length of 100 in., a maximum magnitude of velocity can be expected to occur at a position of 50 in. during the downstroke. However, as shown in the second velocity pattern 610, the velocity of the plunger can deviate from the ideal condition during the downstroke. Accordingly, in some cases, the plunger can reach a maximum velocity at a position other than the point midway through the downstroke. For example, during the downstroke, between the second position 603 and the position identified by the second graphical indicator 618, the velocity of the plunger reaches a maximum magnitude of approximately 45 in./sec., while the estimated velocity corresponding to the condition of 58% pump fillage is approximately 40 in./sec. Accordingly, a maximum estimated impact velocity can be determined based on the position of the second graphical indicator 618. The maximum estimated impact velocity can be a maximum magnitude of velocity observed between the second position 603 and the position of the second graphical indicator 618. A third graphical indicator 622 can identify a maximum estimated impact velocity based on based on the hypothetical, or current, pump fillage condition.

The velocity plot 606 can include a fourth graphical indicator 623 that can identify a current set maximum velocity of the plunger. The fourth graphical indicator 623 that can be located on the downstroke portion of the second velocity pattern 610. If the hypothetical condition of pump fillage, identified by the second graphical indicator 618, is set or entered, the position of the fourth graphical indicator 623 can be adjusted to represent the estimated impact velocity identified by the second graphical indicator 618.

In some embodiments, the current set maximum velocity of the plunger, identified by the fourth graphical indicator 623, can have a corresponding deadband value, and/or range of values, to prevent the plunger from reaching a velocity that is above the current set maximum velocity. For example, the deadband can limit the velocity of the plunger based on the set maximum velocity of the plunger. In the illustrated embodiment, the current set maximum velocity of the plunger is approximately 20 in./sec. In some embodiments, the deadband can limit the maximum velocity of the plunger such that it is within a certain margin of error. For example, the deadband can limit the velocity of the plunger to a value of the current set maximum velocity of 20 in./sec. plus, or minus, about 5 in./sec.

As described herein, the second graphical indicator identifies an estimated impact velocity of approximately 40 in./sec. If the hypothetical pump fillage set point corresponding to the second graphical indicator 618 is entered, the set maximum velocity of the plunger, identified by the fourth graphical indicator 623, will be adjusted to 40 in./sec. Although the maximum velocity is observed to be approximately 45 in./sec., the deadband can prevent the velocity of the plunger from exceeding the set maximum velocity of 40 in./sec. In some embodiments, the deadband can limit the maximum velocity of the plunger such that it is within a certain margin of error. For example, the deadband can limit the velocity of the plunger to a value of the set maximum velocity plus, or minus, 5 in./sec.

The view 600 can also include information panel 605 that can provide options and information related to the velocity plot 606. The information panel can include a checkbox 620 option to display the second velocity pattern 610, as well as first and second textboxes 607, 609 that can provide information related to the second velocity pattern 610. In the illustrated example, the first textbox 607 provides a stroke rate match percentage, and indicates that the second stroke rate, corresponding to the second velocity pattern 610, is a 99% match to the first stroke rate, corresponding to the first velocity pattern 608. The second textbox 609 provides a stroke length match percentage, and indicates that the second stroke length, corresponding to the second velocity pattern 610, is a 99% match to the first stroke length, corresponding to the first velocity pattern 608.

In some embodiments, plunger position and velocity can be normalized as a percentage of gross stroke length. Therefore, the velocity patterns 608, 610 can characterize normalized velocity as a function of normalized position.

In some embodiments, the view 600 can include a set point panel 624. The set point panel 624 can provide values corresponding to a current pump fillage set point, a current fill base, and a maximum fluid load. The set point panel 624 can include textboxes 626, 628, 630 corresponding to pump fillage set point, fill base, and maximum fluid load, respectively. The textboxes 626, 628, 630 can be configured to received input from a user to set the pump fillage set point, fill base, and maximum fluid load, respectively. The set point panel 624 can include a button 632 that a user can select to apply values entered into the textboxes 626, 628, 630. As an example, a user can input a value for a pump fillage set point, and press the button 632. A data processor can receive an input pump fillage set point, process the data, and provide the data for a controller that controls the rod lift system. The controller can receive the data characterizing the input pump fillage set point, and apply the input pump fillage set point as a parameter within a set of operating parameters of the rod lift system. Similarly, values characterizing a fill base and/or maximum fluid load can be delivered to the controller.

Figure 10:
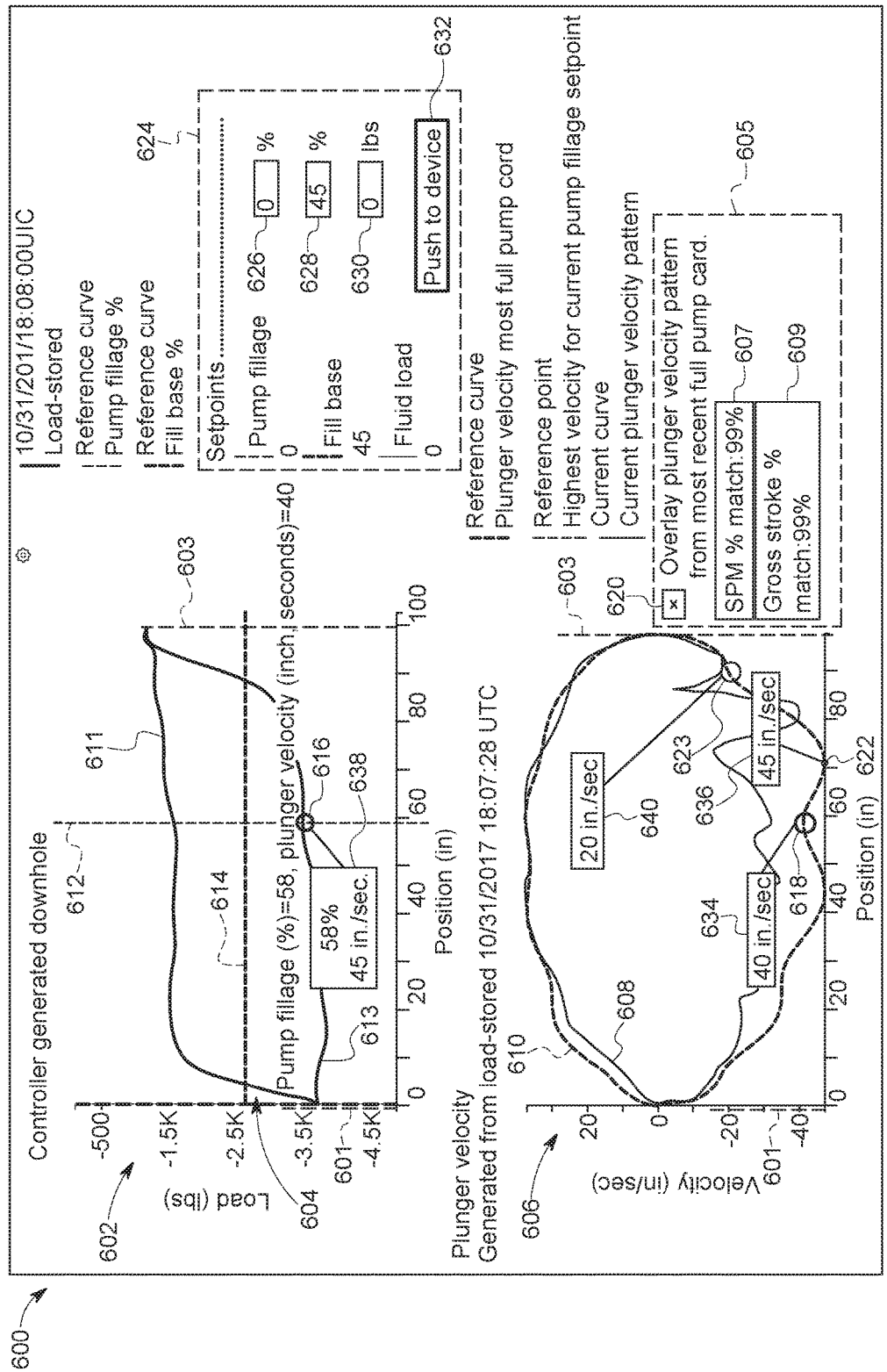
FIG. 10 is a view of the GUI shown in FIG. 9, including textboxes that identify estimated, and maximum estimated, velocities at which a plunger will impact liquid in a well while operating under a hypothetical condition of incomplete pump fillage.

In some embodiments, magnitudes of the estimated impact velocities identified by the second and third graphical indicators 618, 622 can be displayed in textboxes 634, 636, as shown in FIG. 10. Similarly the hypothetical, or current, pump fillage set point and corresponding estimated maximum velocity can be displayed in a textbox 638. The current set maximum velocity identified by the fourth graphical indicator 623 can displayed in a textbox 640. In some embodiments, the textboxes 634, 636, 638, 640 can be positioned adjacent to the graphical indicators 618, 622, 616, 623, for example, as shown in FIG. 10. In other embodiments, the values of pump fillage set point and velocity identified by the graphical indicators 616, 618, 622, 623 can be displayed elsewhere in the view 600.

Accordingly, the velocity pattern 610 can provide a user with useful information regarding potential operation of a rod lift system under various pump fillage conditions, without requiring complex modeling efforts. An estimated impact velocity corresponding to a hypothetical pump fillage set point, identified by the first and second graphical indicators 616, 618, can provide a user with useful insight into potential operation of the rod lift system such that the user can make informed decisions. For example, a user can use the estimated velocity to determine if it is safe to adjust (e.g., increase, or decrease) the pump fillage set point. If the estimated impact velocity, or the maximum estimated impact velocity, identified by the second and third graphical indicators 618, 622, respectively, is high under a hypothetical condition of pump fillage, a user may choose to set the pump fillage set point at a different value, limiting an estimated impact velocity, and/or the maximum estimated impact velocity.

Figure 11:
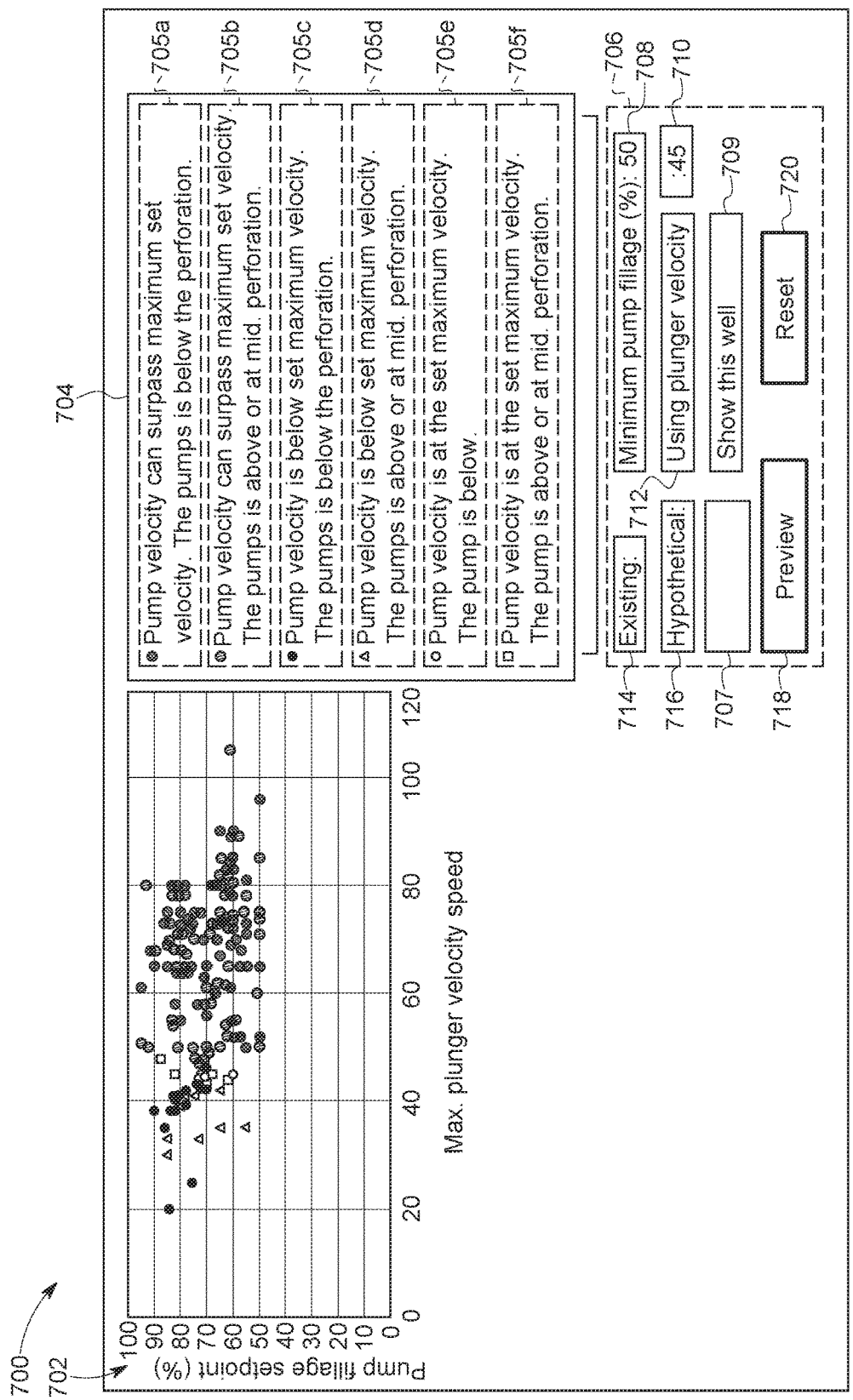
FIG. 11 is a view of the GUI that shows a pump fillage plot that includes data points characterizing pump fillage set points and maximum plunger velocity for multiple wells.

In some embodiments, a view of the GUI can show information related to a number of wells on a well pad, as illustrated in the view 700 shown in FIG. 11. In the illustrated example, the view 700 includes a pump fillage plot 702, a legend 704, and a parameter panel 706.

In FIG. 11, the pump fillage plot 702 includes data points characterizing pump fillage set points and maximum plunger velocity for multiple wells. In some embodiments, the data points corresponds to wells of a single well pad. In other embodiments, the data points can corresponds to well of more than one well pad. In some embodiments, data points on the pump fillage plot 702 can characterize pump fillage set points, as well as other parameters such as, e.g., average plunger velocities, maximum and/or acceleration, etc.

The legend 704 can identify and characterize data sets that can be illustrated in the pump fillage plot 702. The data sets can be determined based on sorting criterion entered into the parameter panel 706, as discussed in more detail below. In the illustrated example, the data point in the pump fillage plot 702 are sorted into six data sets 705*a*, 705*b*, 705*c*, 705*d*, 705*e*, 705*f* that characterize operation of a rod lift system. The data sets 705*a*, 705*b* correspond to rod lift systems that have plungers that can achieve velocities greater than a maximum set velocity. The data set 705*a* identifies rod lift systems with plungers that operate below perforations in a casing in of the wells. The data set 705*b* identifies rod lift systems with plungers that operate at, or above, perforations in a casing of the wells.

The data sets 705*c*, 705*d* correspond to rod lift systems that have plungers that have maximum velocities that are below the maximum set velocity. The data set 705*c* identifies rod lift systems with plungers that operate below perforations in a casing in of the wells. The data set 705*d* identifies rod lift systems with plungers that operate at, or above, perforations in a casing of the wells.

The data sets 705*e*, 705*f* correspond to rod lift systems that have plungers that have maximum velocities that at the maximum set velocity. The data set 705*e* identifies rod lift systems with plungers that operate below perforations in a casing in of the wells. The data set 705*f* identifies rod lift systems with plungers that operate at, or above, perforations in a casing of the wells.

The parameter panel 706 can include options for displaying information on the pump fillage plot 702. For example, the parameter panel can include textboxes 708, 710 that can be configured to receive input data characterizing a current pump fillage set point to diagnose or assess current operating conditions, and a maximum plunger velocity to create hypothetical cases, respectively. A user can choose to sort data points on the pump fillage plot 702 based on operating parameters such as, e.g., a maximum plunger velocity, or a pump fillage set point, using a menu 712. In the illustrated example, the data points in the pump fillage plot 702 are sorted by maximum plunger velocity.

The parameter panel 706 can also include buttons 714, 716 that can allow a user to plot data points characterizing current well operating conditions, or hypothetical well operating conditions. For example, if the button 714 is selected, the pump fillage plot 702 can show data points characterizing wells based on current pump fillage set points and maximum plunger velocities. The plot can also sort the wells based on the option selected in the menu 712, and the corresponding value entered into the textboxes 708, 710. As another example, if the button 716 is selected, the plot 702 can identify data points corresponding to wells that can operate under one or more of the conditions entered into the textboxes 708, 710, depending on a sorting method selected in the menu 712. The parameter panel can also include preview and reset buttons 718, 720 that can execute hypothetical models based on hypothetical well operating conditions, and reset the plot 702 to show data points based on current operating conditions, respectively. The ability to assess hypothetical operating conditions of a well can provide a user with the ability to quickly evaluate aggressive models, or hypothetical well operating conditions, in which a pump fillage set point is set to be low, as well as providing the ability for a user to assess more conservative models in which the pump fillage set point is set high to protect the rod lift systems.

Figure 12:
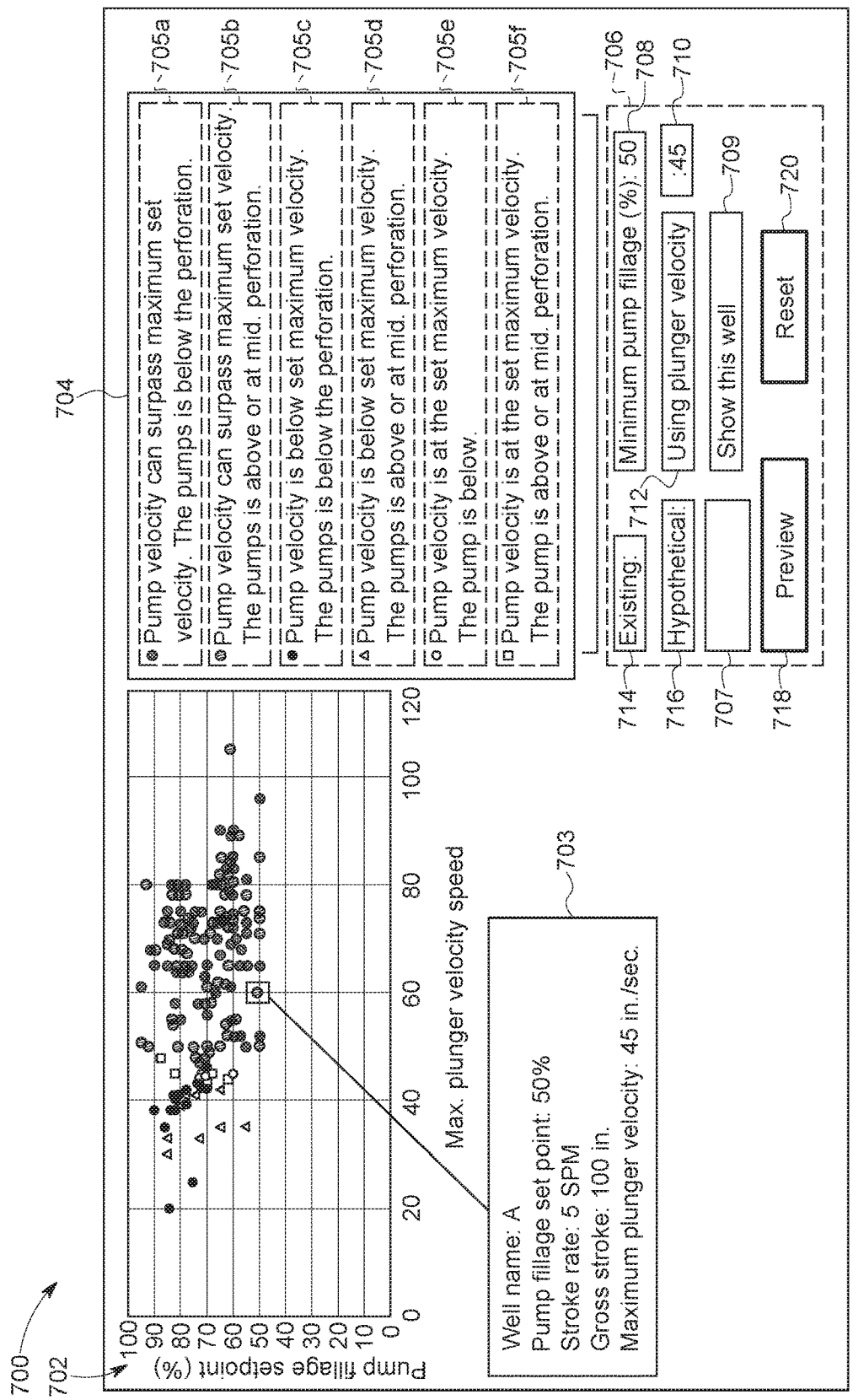
FIG. 12 is a view of the GUI shown in FIG. 11, including a textbox that shows information about a well and a corresponding rod lift pump system.

In the illustrated embodiment, a user can select a data point on the pump fillage plot 702, and a textbox 703 showing information about the well and a corresponding rod lift system can be displayed, as shown in FIG. 12. The textbox 703 can display a well name, a pump fillage set point, a stroke rate, a stroke length, or gross stroke, and a maximum plunger velocity. In some cases, for example if the button 716 corresponding to hypothetical inputs is selected, the textbox 703 can show information related to the hypothetical inputs.

Figure 13:
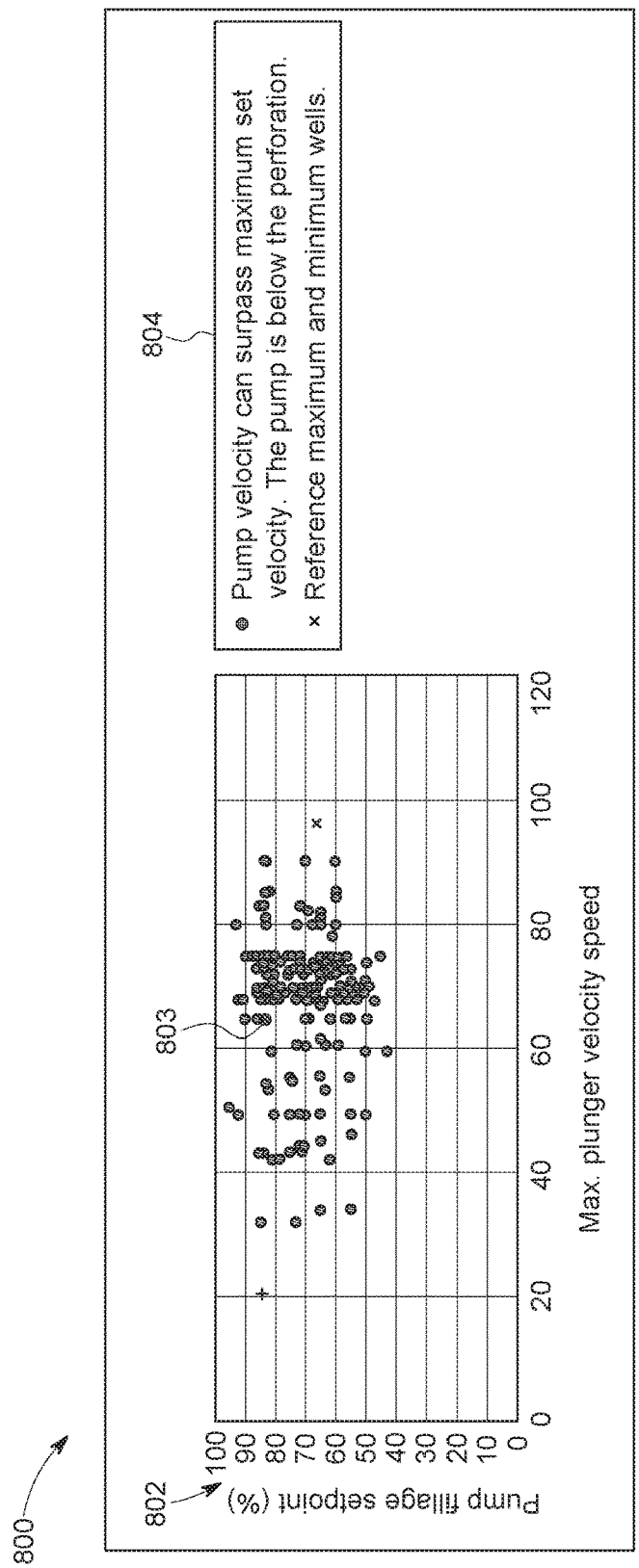
FIG. 13 is a view of the GUI that includes a pump fillage plot with a highlighted data point corresponding to a well identified using the view of the GUI shown in FIG. 11.

In some embodiments, parameter panel 706 can also include a textbox 707 that can receive data that can identify one or more wells. For example, a user can enter a well identification number, a well name, or other identifying parameter, into the textbox 707, and can press a button 709 to display a data point corresponding to the well on the pump fillage plot 702. In some embodiments, a data point can be identified based on values entered into the textboxes 708, 710, and a sorting criterion selected in the dropdown menu 712. FIG. 13 shows a view 800 that includes a pump fillage plot 802 with a data point 803 corresponding to a well identified by data entered into the textbox 707. A legend 804 can provide identifying characteristics of the data point 803, and can describe selection criterion entered into the textboxes 707, 708, 710.

Figure 14:
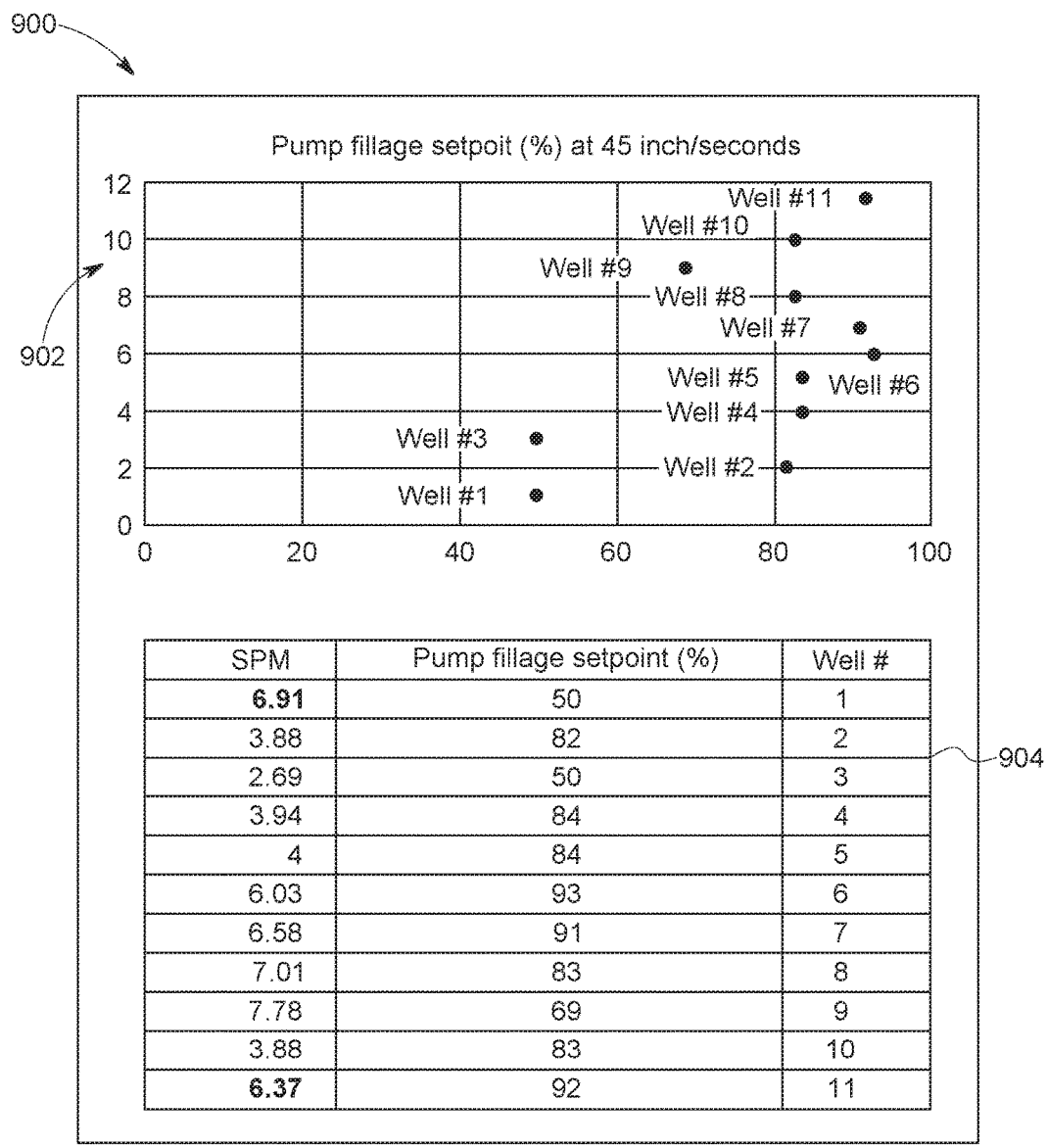
FIG. 14 is a view of the GUI that includes a well plot that includes data points characterizing well numbers and pump fillage set points for multiple wells, and a well table that includes data characterizing stroke rates and pump fillage set points of the wells identified in the well plot.

FIG. 14 shows another view 900 of a GUI that can be rendered on a display of a user device. The view can include a well plot 902 and a well table 904. The well plot 902 includes data points characterizing well numbers and pump fillage set points for multiple wells. The well table 904 can include data characterizing stroke rates and pump fillage set points of the wells identified in the well plot 902.

Figure 15:
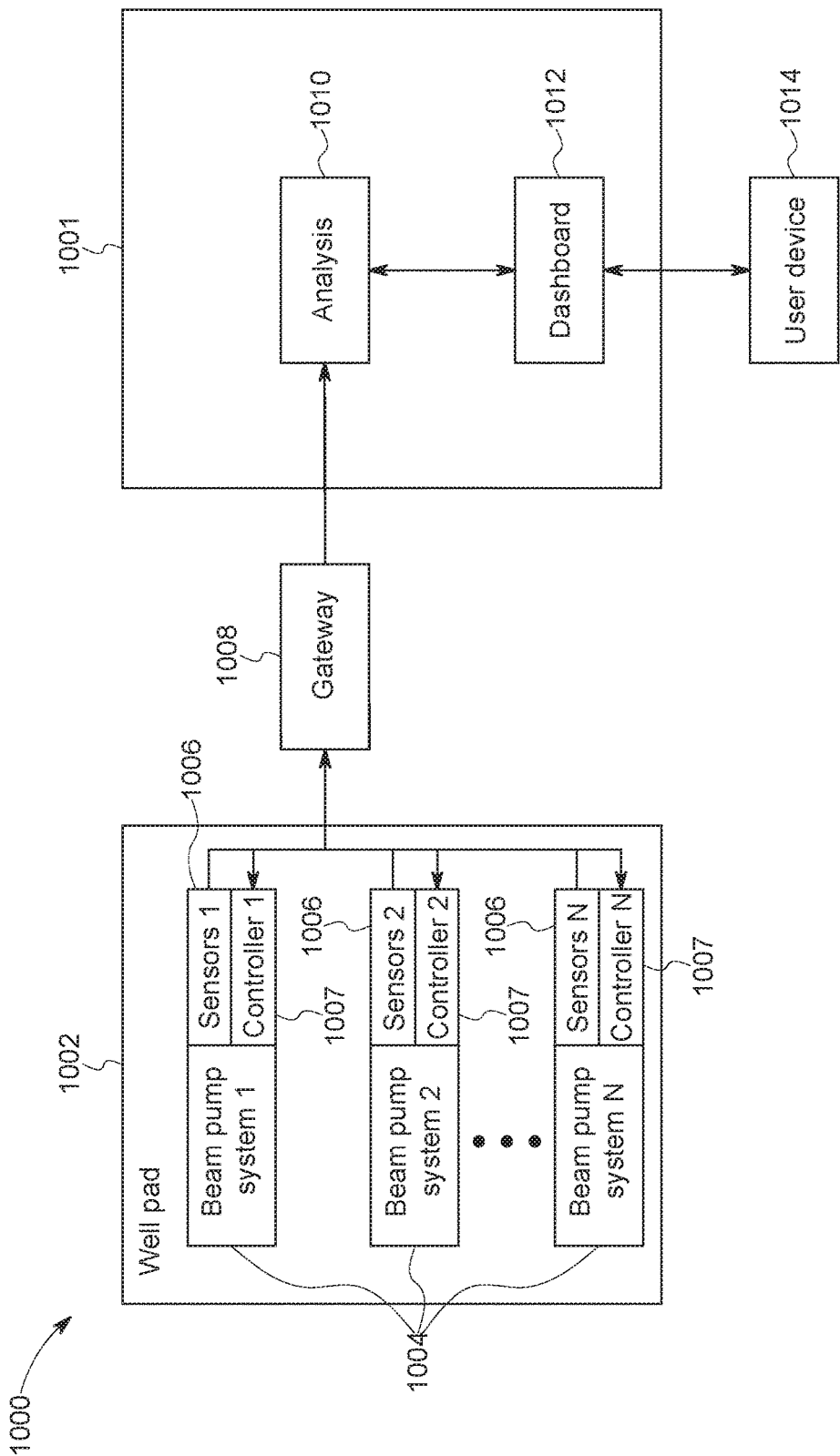
FIG. 15 is a system block diagram of an exemplary embodiment of a monitoring and control system configured to facilitate estimating plunger impact velocities at various current and hypothetical pump fillage set points.

FIG. 15 illustrates an exemplary system block diagram of an embodiment of a monitoring and control system 1000 configured to facilitate estimating plunger impact velocities at various hypothetical pump fillage set points. The monitoring and control system 1000 can include an advisory system 1001 that can be configured to provide a rod lift operator with useful insight into potential operation of the rod lift system such that the plant operator can make informed decisions. In the illustrated embodiment, the advisory system 1001 is operably coupled to a well pad 1002 that includes a number of rod lift systems 1004 in which each rod lift system 1004 corresponds to a well. Each rod lift system 1004 can have one or more sensors 1006 operable coupled thereto for measuring operating values of the rod lift systems 1004. For example, the sensors 1006 can be similar to the sensor 127, 129, described herein with regard to FIGS. 1-4, and can measure positions of plungers of the rod lift systems 1004, as well as loads on rods of the beam bump systems 1004, over time. Alternatively, the sensors 1006 can be positioned at a surface of the well. The sensors 1006 can communicate with the advisory system 1001 via a gateway 1008 (e.g., a router). The advisory system 1001 can also be operably coupled to other type of facilities as well. Each rod lift system 1004 can also have one or more controllers 1007 operably couple thereto for controlling operation of the rod lift systems 1004. The controllers 1007 can communicate with the advisory system 1001 via the gateway 1008. For example, the advisory system 1001 deliver data characterizing instructions for setting a stroke rate and/or a pump fillage set point to the controllers 1007 via the gateway 1008.

The advisory system 1001 can include an analysis module 1010 and a dashboard 1012, both of which can be, or can include a data processor. The analysis module 1010 can be configured to process data from the sensor and generate operational data characterizing an operational status of the rod lift systems 1004 of the well pad 1002. For example, the analysis module 1010 can receive sensor data such as position data characterizing a position of a plunger, and/or a position of a rod at the surface, over time, load data characterizing a load on a rod over time, and velocity data characterizing a velocity of the plunger, from the sensor 1006. In some embodiments, the analysis module 1010 can determine the velocity data using the position data. The analysis module 1010 can also correlate the load on the rod and the position of the plunger using the load data and the position data, as well as the position and velocity of the plunger, using the position data and the velocity data. Data characterizing the correlated load on the rod and the position of the plunger can be referred to as load pattern data, and data characterizing the correlated position and velocity of the plunger can be referred to as velocity pattern data. The analysis module 1010 can provide the operational data, including the load pattern data and the velocity pattern data, to the dashboard 1012.

The dashboard 1012 can be configured to facilitate communication between the analysis module 1010 and a user device 1014. The dashboard 1012 can receive the operational data, format the operational data, and create instructions that the user device 1014 can use to render a GUI (e.g. the GUIs illustrated in FIGS. 9-14) that can provide the user with some, or all, of the operational data, as desired. For example, the dashboard 1012 can receive the load pattern data, and the velocity pattern data, format the load pattern data and the velocity pattern data, and generate instructions for rendering the load pattern data and the velocity pattern data on a display of the user device 1014. In some embodiments, the dashboard can render a GUI, including a load pattern and velocity pattern based on the load pattern data and the velocity pattern data, respectively. The dashboard can provide the rendered GUI to the user device 1014. The user device 1014 can display the GUI on a graphical interface display space of the user device 1014.

The dashboard 1012 can also receive input data from the user device 1014. For example, a plant operator can provide instructions for altering a maximum fluid load, stroke rate and/or a pump fillage set point for one or more of the rod lift systems 1004 via the user device 1014. The dashboard 1012 can receive the instructions, format the instructions, and provide the instructions to the analysis module 1010. The analysis module 1010 can receive the instructions, format the instructions, and deliver data characterizing the formatted instructions to the controllers 1007 coupled to the rod lift systems 1004. The controllers 1007 can receive the data characterizing the instructions, process the data, and apply the instructions to alter operation of the rod lift systems 1004.

Exemplary technical effects of the subject matter described herein include the ability to estimate a velocity at which a plunger of a rod lift system will impact a fluid within a well if the rod lift system is altered to operate under various conditions of pump fillage. Estimated impact velocities corresponding to various hypothetical conditions of pump fillage can be determined by operating the rod lift system under a condition of complete pump fillage, using sensors to determine a position of the plunger of the rod lift system, and generating a velocity pattern characterizing a pump cycle of the operation, based on data from the sensor. For example, the sensor data can be delivered to an analysis module, which can be, or can include, a data processor. The analysis module can receive the sensor data, process the data, and generate the velocity pattern. In some embodiments, the velocity pattern can characterize an average pump cycle for a given set of operating parameters. Data characterizing the velocity pattern can be delivered to a dashboard, which can be, or can include, a data processor. The dashboard can receive the data, format the data, and deliver it to a user device to be displayed on a graphical interface display space of the user device.

In some embodiments, the dashboard can render a GUI, including a graphical representation of the velocity pattern, and deliver data characterizing the GUI to the user device to be displayed. In other embodiments, the dashboard can deliver data characterizing the GUI to the user device, and a data processor of the user device can render the GUI to be displayed. The user can identify a hypothetical condition of pump fillage by interacting with a graphical element displayed on the graphical interface display space of the user device. The estimated impact velocity corresponding to the identified hypothetical condition of pump fillage can be displayed on the graphical interface display space of a user device. The user can adjust the hypothetical condition of pump fillage by interacting with the graphical element display on the graphical interface displace space of the user device, and the estimated impact velocity can be updated accordingly. The estimated impact velocity can provide a user with useful insight into potential operation of the rod lift system while operating under various conditions of pump fillage, without requiring time consuming modelling efforts. For example, if the estimated impact velocity is high under a certain hypothetical condition of pump fillage, the user can choose to set the pump fillage set point at a different value to operate in a section of the plunger velocity pattern that limits the impact velocity during conditions of incomplete pump fillage.

As described herein, in some embodiments, the user can enter a pump fillage set point using a GUI displayed on the graphical interface display space of the user device. Data characterizing the pump fillage set point can be delivered to a dashboard. The dashboard can receive the data instructions, and provide the instructions to an analysis module. The analysis module can receive the instructions, format the instructions, and deliver data characterizing the formatted instructions to controllers coupled to the rod lift systems. The controllers can receive the data characterizing the instructions, process the data, and apply the instructions to alter operation of the rod lift systems.

As described herein, utilizing a velocity pattern to provide an estimated impact velocity can provide a user with useful insight into potential operation of the rod lift system while operating under various conditions of pump fillage, without requiring time consuming modelling efforts. Computer generated models that can be used to simulate operation of rod lift systems can be complex and involve a relatively high number of variables. As a result of the complexity of the models, the modeling can be very time intensive. Estimating the impact velocity of the plunger when operating under a hypothetical condition of pump fillage provides a quick and easy way to gain insight into potential operation of the rod lift system, as compared to other modeling techniques.

One skilled in the art will appreciate further features and advantages of the subject matter described herein based on the above-described embodiments. Accordingly, the present application is not to be limited specifically by what has been particularly shown and described. All publications and references cited herein are expressly incorporated herein by reference in their entirety.

Other embodiments are within the scope and spirit of the disclosed subject matter. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Further, in the present disclosure, like-named components of the embodiments generally have similar features, and thus within a particular embodiment each feature of each like-named component is not necessarily fully elaborated upon.

Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method, comprising:
   receiving position data characterizing a position of a plunger over time, the plunger forming part of a rod lift pump system, the position measured by a first sensor, the plunger being configured to travel between a first position and a second position within a barrel within a well, and a distance between the first position and the second position defining a stroke length;
   receiving load data characterizing a load on a rod over time, the load measured by a second sensor, the rod coupled to the plunger;
   receiving velocity data characterizing a velocity of the plunger while the rod lift pump system is operating under a condition of complete pump fillage, wherein a portion of the barrel between the first position and the second position is filled with liquid prior to a downstroke of the plunger;
   correlating, using at least the received load data and position data, the load on the rod and the position of the plunger; and
   displaying, on a graphical interface display space, a visualization of the velocity data simultaneously with a visualization of the correlated load and position.

2. The method of claim 1, wherein correlating the load on the rod and the position of the plunger includes determining a position of the plunger at a first time, determining a load on the rod at the first time, and matching the position of the plunger at the first time and load of the rod at the first time.

3. The method of claim 1, further comprising determining the velocity data using at least the received position data.

4. The method of claim 1, wherein the load data characterizes the load on the rod coupled to the plunger over time while the rod lift pump system is operating under a condition of incomplete pump fillage, wherein a portion of the barrel between a first position and the second position is filled with gas prior to a downstroke of the plunger.

5. The method of claim 1, wherein the rod is configured to drive the plunger between the first position and the second position.

6. The method of claim 1, further comprising
   correlating, using at least the position data and the velocity data, the position and the velocity of the plunger;
   displaying, on the graphical interface display space, an interactive graphical element configured to interact with the visualization of the correlated load and position, a position of the interactive graphical element being adjustable by a user, wherein the position of the interactive graphical element identifies a position of the plunger and a correlated load on the rod; and displaying, on a graphical interface display space, a visualization of a velocity of the plunger corresponding to the identified position of the plunger based on the correlated velocity and position of the plunger.

7. The method of claim 6, wherein the visualization of the velocity of the plunger corresponding to the identified position of the plunger includes a textbox graphical element.

8. The method of claim 1, wherein at least one of the receiving, the correlating, and the displaying is performed by at least one data processor forming part of at least one computing system.

9. A non-transitory computer program product comprising computer readable instructions, which, when executed by at least one data processor forming part of at least one computing system, implement operations comprising:
    receiving position data characterizing a position of a plunger over time, the plunger forming part of a rod lift pump system, the position measured by a first sensor, the plunger being configured to travel between a first position and a second position within a barrel within a well, and a distance between the first position and the second position defining a stroke length;
    receiving load data characterizing a load on a rod over time, the load measured by a second sensor, the rod coupled to the plunger;
    receiving velocity data characterizing a velocity of the plunger while the rod lift pump system is operating under a condition of complete pump fillage, wherein a portion of the barrel between the first position and the second position is completely filled with liquid prior to a downstroke of the plunger;
    correlating, using at least the received load data and position data, the load on the rod and the position of the plunger; and
    displaying, on a graphical interface display space, a visualization of the velocity data simultaneously with a visualization of the correlated load and position.

10. The non-transitory computer program product of claim 9, wherein correlating the load on the rod and the position of the plunger includes determining a position of the plunger at a first time, determining a load on the rod at the first time, and matching the position of the plunger at the first time and load of the rod at the first time.

11. The non-transitory computer program product of claim 9, the operations comprising determining the velocity data using at least the received position data.

12. The non-transitory computer program product of claim 9, wherein the load data characterizes the load on the rod coupled to the plunger over time while the rod lift pump system is operating under a condition of incomplete pump fillage, wherein a portion of the barrel between a first position and the second position is filled with gas prior to a downstroke of the plunger.

13. The non-transitory computer program product of claim 9, wherein the rod is configured to drive the plunger between the first position and the second position.

14. The non-transitory computer program product of claim 9, the operations comprising
    correlating, using at least the position data and the velocity data, the position and the velocity of the plunger;
    displaying, on the graphical interface display space, an interactive graphical element configured to interact with the visualization of the correlated load and position, a position of the interactive graphical element being adjustable by a user, wherein the position of the interactive graphical element identifies a position of the plunger and a correlated load on the rod; and
    displaying, on a graphical interface display space, a visualization of a velocity of the plunger corresponding to the identified position of the plunger based on the correlated velocity and position of the plunger.

15. The non-transitory computer program product of claim 14, wherein the visualization of the velocity of the plunger corresponding to the identified position of the plunger includes a textbox graphical element.

16. A system comprising at least one data processor and memory coupled to the processor, the memory storing executable instructions, which, when executed by the at least one data processor, implement operations comprising:
    receiving position data characterizing a position of a plunger over time, the plunger forming part of a rod lift pump system, the position measured by a first sensor, the plunger being configured to travel between a first position and a second position within a barrel within a well, and a distance between the first position and the second position defining a stroke length;
    receiving load data characterizing a load on a rod over time, the load measured by a second sensor, the rod coupled to the plunger;
    receiving velocity data characterizing a velocity of the plunger while the rod lift pump system is operating under a condition of complete pump fillage, wherein a portion of the barrel between the first position and the second position is completely filled with liquid prior to a downstroke of the plunger;
    correlating, using at least the received load data and position data, the load on the rod and the position of the plunger; and
    displaying, on a graphical interface display space, a visualization of the velocity data simultaneously with a visualization of the correlated load and position.

17. The system of claim 16, wherein correlating the load on the rod and the position of the plunger includes determining a position of the plunger at a first time, determining a load on the rod at the first time, and matching the position of the plunger at the first time and load of the rod at the first time.

18. The system of claim 16, further comprising determining the velocity data using at least the received position data.

19. The system of claim 16, wherein the load data characterizes the load on the rod coupled to the plunger over time while the rod lift pump system is operating under a condition of incomplete pump fillage, wherein a portion of the barrel between a first position and the second position is filled with gas prior to a downstroke of the plunger.

20. The system of claim 16, wherein the rod is configured to drive the plunger between the first position and the second position.

21. The system of claim 16, further comprising
    correlating, using at least the position data and the velocity data, the position and the velocity of the plunger;
    displaying, on the graphical interface display space, an interactive graphical element configured to interact with the visualization of the correlated load and position, a position of the interactive graphical element being adjustable by a user, wherein the position of the interactive graphical element identifies a position of the plunger and a correlated load on the rod; and
    displaying, on a graphical interface display space, a visualization of a velocity of the plunger corresponding to the identified position of the plunger based on the correlated velocity and position of the plunger.

22. The system of claim 21, wherein the visualization of the velocity of the plunger corresponding to the identified position of the plunger includes a textbox graphical element.

* * * * *